(12) United States Patent
Nishiura et al.

(10) Patent No.: US 11,950,550 B2
(45) Date of Patent: Apr. 9, 2024

(54) IRRIGATION DEVICE AND CELL PLUG USED FOR SAME

(71) Applicants: UNIVERSITY PUBLIC CORPORATION OSAKA, Osaka (JP); KUSAKABE KIKAI CO., LTD., Toyonaka (JP)

(72) Inventors: Yoshifumi Nishiura, Sakai (JP); Koji Shimada, Kusatsu (JP)

(73) Assignees: UNIVERSITY PUBLIC CORPORATION OSAKA, Osaka (JP); KUSAKABE KIKAI CO., LTD., Toyonaka (JP)

( * ) Notice: Subject to any disclaimer, the term of this patent is extended or adjusted under 35 U.S.C. 154(b) by 146 days.

(21) Appl. No.: 17/638,429

(22) PCT Filed: Aug. 24, 2020

(86) PCT No.: PCT/JP2020/031855
§ 371 (c)(1),
(2) Date: Feb. 25, 2022

(87) PCT Pub. No.: WO2021/039723
PCT Pub. Date: Mar. 4, 2021

(65) Prior Publication Data
US 2022/0304246 A1    Sep. 29, 2022

(30) Foreign Application Priority Data

Aug. 29, 2019  (JP) .................................. 2019-156948

(51) Int. Cl.
*A01G 9/02* (2018.01)
*A01G 27/02* (2006.01)

(52) U.S. Cl.
CPC ............... *A01G 9/02* (2013.01); *A01G 27/02* (2013.01)

(58) Field of Classification Search
CPC .................................. A01G 9/02; A01G 27/02
See application file for complete search history.

(56) References Cited

U.S. PATENT DOCUMENTS

2016/0106044 A1* 4/2016 Markham ............... A01G 9/02
47/79
2019/0200540 A1 7/2019 Nishiura et al.

FOREIGN PATENT DOCUMENTS

EP          1 642 492 A1    4/2006
GB            180967 A      6/1922
(Continued)

OTHER PUBLICATIONS

International Preliminary Report on Patentability and Written Opinion dated Mar. 10, 2022, in PCT/JP2020/031855.
(Continued)

*Primary Examiner* — Richard G Davis
(74) *Attorney, Agent, or Firm* — Birch, Stewart, Kolasch & Birch, LLP

(57) ABSTRACT

An irrigation device includes: a cell plug that includes an opening facing upward and an accommodation part that accommodates a predetermined amount of culture medium in communication with the opening; a liquid supply unit that supplies a liquid to a culture medium of the cell plug; and a cell plug lifting unit that lowers the cell plug when a weight of the cell plug is increased by a liquid supplied by the liquid supply unit and lifts the cell plug when a weight of the cell plug is decreased by drying of a culture medium. The liquid supply unit includes a contact end that is intermittently brought into contact with a culture medium by lifting and lowering of the cell plug by the cell plug lifting unit, performs liquid supply while the contact end is in contact with a culture medium, and stops liquid supply when the contact end is separated from a culture medium.

11 Claims, 4 Drawing Sheets

(56) References Cited

FOREIGN PATENT DOCUMENTS

| | | |
|---|---|---|
| GB | 2507348 A | 4/2014 |
| JP | 54-180158 U | 12/1979 |
| JP | 60-30624 A | 2/1985 |
| JP | 2-76524 A | 3/1990 |
| JP | 5-153878 A | 6/1993 |
| JP | 8-317732 A | 12/1996 |
| JP | 2002-360079 A | 12/2002 |
| KR | 10-1007875 B1 | 1/2011 |
| WO | WO2018/047625 A1 | 3/2018 |

OTHER PUBLICATIONS

Extended European Search Report for European Application No. 20858659.4, dated Aug. 3, 2023.
International Search Report, issued in PCT/JP2020/031855, PCT/ISA/210, dated Nov. 10, 2020.
Written Opinion of the International Searching Authority, issued in PCT/JP2020/031855, PCT/ISA/237, dated Nov. 10, 2020.

* cited by examiner

US 11,950,550 B2

IRRIGATION DEVICE AND CELL PLUG USED FOR SAME

TECHNICAL FIELD

The present invention relates to an irrigation device and a cell plug used for same.

BACKGROUND ART

For example, Patent Document 1 discloses a seedling growing device that grows a plurality of seedlings using a plurality of cell plugs. The plurality of cell plugs are containers separated from one another, and a culture medium is accommodated in each cell plug and one seedling (or seed to become a seedling) is planted in each cell plug.

PRIOR ART DOCUMENT

Patent Document

Patent Document 1: International Publication No. 2018/047625

SUMMARY OF THE INVENTION

Problems to be Solved by the Invention

In order to uniformly grow a plurality of seedlings, it is preferable to supply an appropriate amount of liquid (water or nutrient solution) to the culture medium without excess or deficiency according to the state of the culture medium of each cell plug. However, in order to supply an appropriate amount of liquid to the culture medium according to the state of the culture medium for each of the plurality of cell plugs, for example, an irrigation device having a complicated configuration such as a soil moisture sensor that detects the moisture amount of the culture medium and a valve that controls the supply amount of liquid based on the detection result of the sensor is required.

Therefore, an object of the present invention is to supply an appropriate amount of liquid, without excess or deficiency, to a culture medium of a cell plug in which seedlings are planted with a simple configuration according to the state of the culture medium.

Means for Solving the Problems

According to one aspect of the present invention,
an irrigation device is provided, the irrigation device including:
a cell plug that includes an opening facing upward and an accommodation part that accommodates a predetermined amount of culture medium in communication with the opening;
a liquid supply unit that supplies a liquid to a culture medium of the cell plug; and
a cell plug lifting unit that lowers the cell plug when a weight of the cell plug is increased by a liquid supplied by the liquid supply unit and lifts the cell plug when a weight of the cell plug is decreased by drying of a culture medium, in which
the liquid supply unit includes a contact end that is intermittently brought into contact with a culture medium by lifting and lowering of the cell plug by the cell plug lifting unit, performs liquid supply while the contact end is in contact with a culture medium, and stops liquid supply when the contact end is separated from a culture medium.

Effects of the Invention

According to the present invention, it is possible to supply an appropriate amount of liquid, without excess or deficiency, to a culture medium of a cell plug in which seedlings are planted with a simple configuration according to the state of the culture medium.

MODES FOR CARRYING OUT THE INVENTION

An irrigation device according to embodiments of the present invention will be described below with reference to the drawings.

First Embodiment

Figure 1:
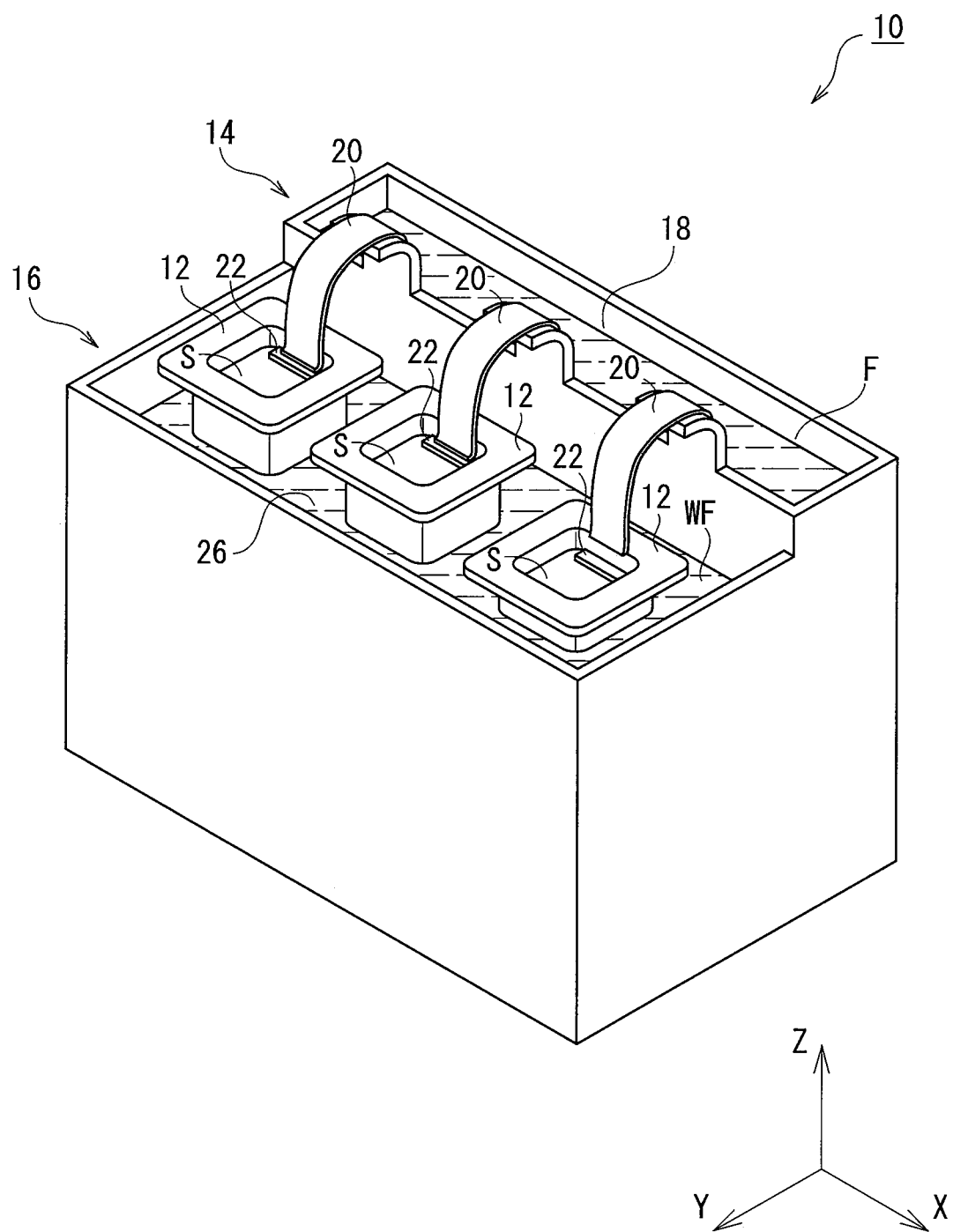
FIG. 1 is a perspective view schematically illustrating an irrigation device according to a first embodiment of the present invention.
Figure 2:
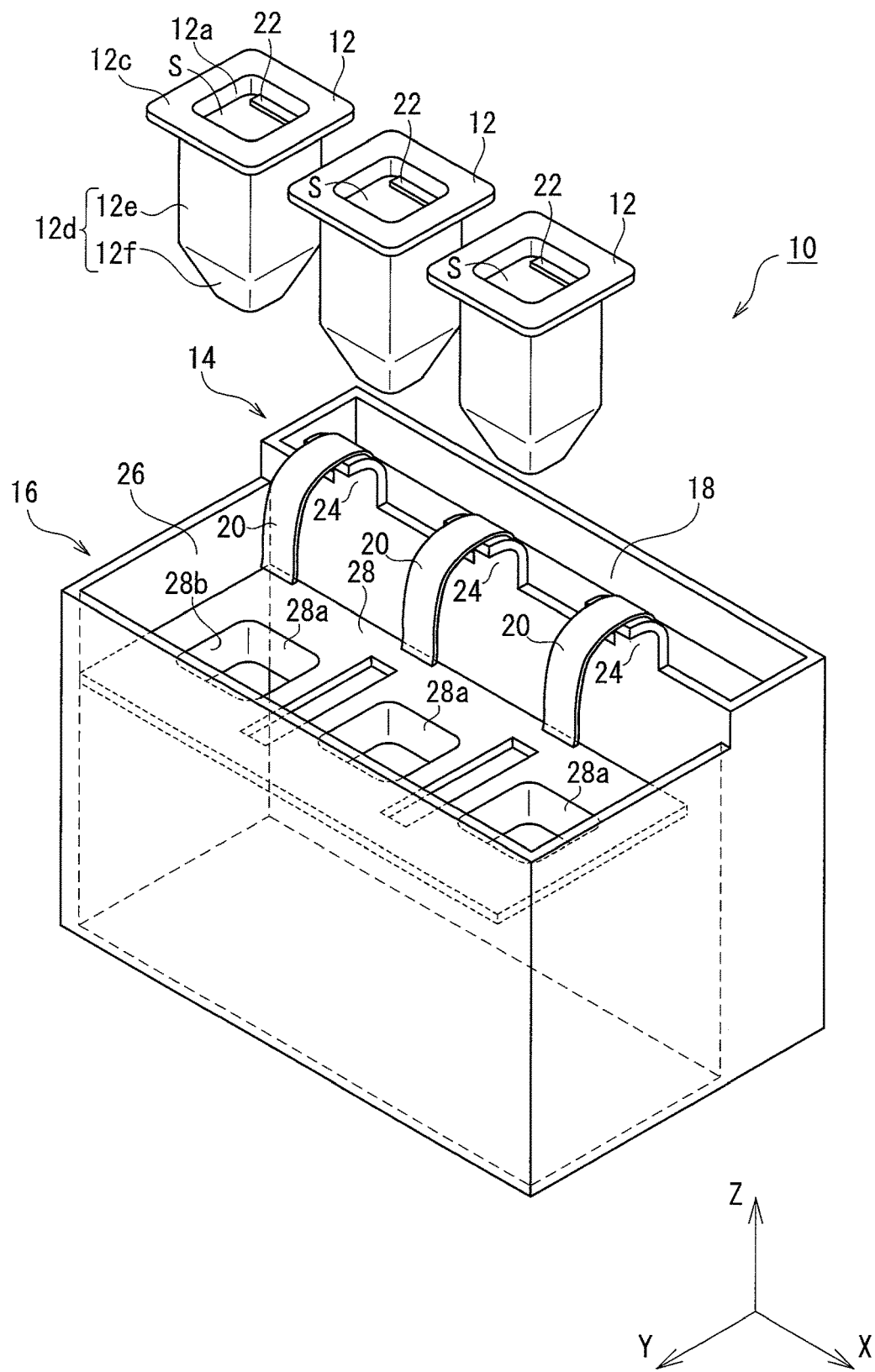
FIG. 2 is an exploded perspective view of the irrigation device in a state where a plurality of cell plugs are removed.
Figure 3A:
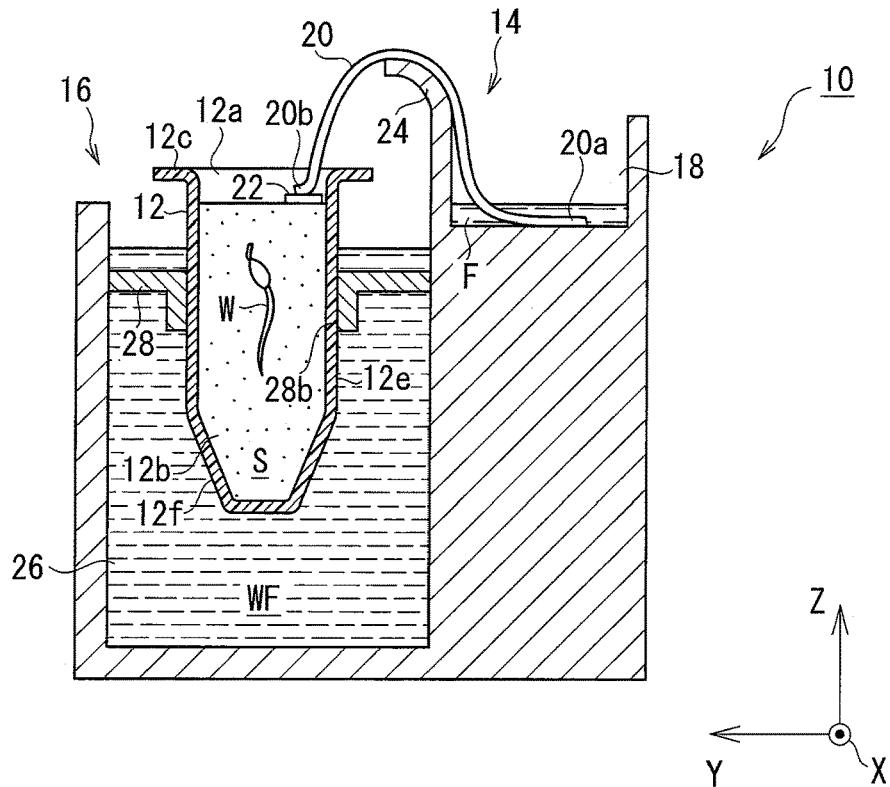
FIG. 3A is a cross-sectional view of the irrigation device during execution of liquid supply.
Figure 3B:
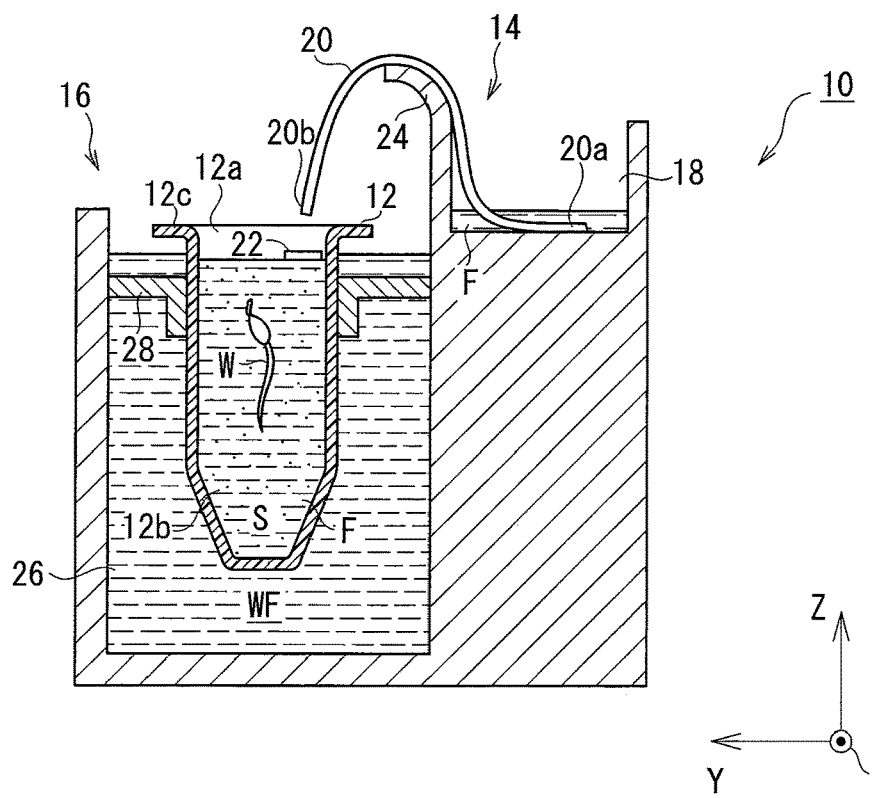
FIG. 3B is a cross-sectional view of the irrigation device during interruption of liquid supply.

FIG. 1 is a perspective view schematically illustrating the irrigation device according to the first embodiment of the present invention. FIG. 2 is an exploded perspective view of the irrigation device in a state where the plurality of cell plugs are removed. FIG. 3A is a cross-sectional view of the irrigation device during execution of liquid supply. FIG. 3B is a cross-sectional view of the irrigation device during interruption of liquid supply. Note that the X-Y-Z coordinate system illustrated in the drawings is for facilitating understanding of the present invention, and does not limit the present invention. The Z-axis direction is a vertical direction, and the X-axis direction and the Y-axis direction are horizontal directions orthogonal to the Z-axis direction.

An irrigation device 10 of the first embodiment includes a plurality of cell plugs 12, a liquid supply unit 14 that supplies a liquid F to each cell plug 12, and a cell plug lifting unit 16 that detachably holds and lifts and lowers each cell plug 12.

As illustrated in FIG. 3A, each of the plurality of cell plugs 12 is a bottomed cylindrical container including an opening 12a and an accommodation part 12b that accommodates a predetermined amount of a culture medium S in communication with the opening 12a. One seedling W is planted in the culture medium S. Note that the culture medium S is a natural soil, an artificial culture medium, a sponge, or the like.

In the case of the present first embodiment, as illustrated in FIG. 2, the cell plug 12 includes a square-shaped flange part 12c, which is an edge of the opening 12a, and a bottomed cylindrical main body part 12d, which extends from the flange part 12c and defines the accommodation part 12b therein. The main body part 12d includes a rectangular parallelepiped cylindrical part 12e extending from the flange part 12c in the opening direction (Z-axis direction) of the opening 12a, and an inverted quadrangular frustum bottom part 12f connected to the cylindrical part. The reason for such a shape, which will be described in detail later, is to make the cell plug 12 easily float into liquid in a substantially constant posture in which the opening 12a faces upward so that no liquid enters the accommodation part 12b, as fishing float used for fishing floats in a substantially constant posture.

Although details will be described later, in the case of the present first embodiment, the cell plug 12 accommodates a predetermined amount of the culture medium S, and is made of a material that floats on water when the entire culture medium S is in a wet state (water retention state), for example, a resin material.

As illustrated in FIG. 1, the irrigation device 10 of the present first embodiment includes three cell plugs 12, but the number of cell plugs 12 included in the irrigation device may be one, two, or four or more.

As illustrated in FIG. 1, in the case of the present first embodiment, the liquid supply unit 14 of the irrigation device 10 includes a liquid accommodation part 18 and a plurality of liquid feeding members 20 that supply the liquid in the liquid accommodation part 18 to the culture medium S of each of the plurality of cell plugs 12.

The liquid accommodation part 18 of the liquid supply unit 14 is a tank that accommodates the liquid F necessary for growing the seedling W, for example, water or a nutrient solution. In the case of the present first embodiment, the liquid accommodation part 18 is shared by the plurality of cell plugs 12. Note that the liquid accommodation part 18 may be a gutter through which the liquid F flows.

As illustrated in FIGS. 3A and 3B, in the case of the present first embodiment, the plurality of liquid feeding members 20 of the liquid supply unit 14 are members that feed the liquid F by capillary action from the liquid accommodation part 18 to the culture medium S in the corresponding cell plug 12. The liquid feeding member 20 is, for example, a nonwoven fabric. Instead of the nonwoven fabric, the liquid feeding member 20 may be a string, a sponge, a net, or the like.

As illustrated in FIGS. 3A and 3B, the liquid feeding member 20 is a belt-shaped member including one end 20a, which is immersed in the liquid F in the liquid accommodation part 18, and the other end 20b, which is a contact end in contact with the culture medium S in the cell plug 12. The liquid feeding member 20 absorbs the liquid F in the liquid accommodation part 18 at one end 20a thereof and feeds the absorbed liquid F to the other end 20b by capillary action. The liquid F fed to the other end 20b is absorbed by the culture medium S when in a state where the other end 20b is in contact with the culture medium S in the cell plug 12. Then, as illustrated in FIG. 3B, the liquid F spreads over the entire culture medium S.

In the case of the present first embodiment, a water retention member 22 such as a nonwoven fabric or a sponge is placed on the culture medium S in the cell plug 12, and the other end 20b of the liquid feeding member 20 comes into contact with the water retention member 22. Due to this, the liquid feeding member 20 supplies the liquid F to the culture medium S via the water retention member 22. The water retention member 22 is a member for suppressing the other end 20b of the liquid feeding member 20 from being contaminated by coming into direct contact with the culture medium S. Instead of using the water retention member 22, the liquid feeding member 20 may be periodically replaced or cleaned.

In the case of the present embodiment 1, the liquid supply unit 14 includes a support unit 24 that supports the liquid feeding member 20 such that the other end (contact end) 20b of the liquid feeding member 20 is positioned on the culture medium S (water retention member 22 in the case of the present embodiment 1) in the cell plug 12 and the other end 20b is positioned at the same level or a higher level with respect to the one end 20a. This suppresses a large amount of the liquid F from moving from the one end 20a to the other end 20b. As a result, when the liquid feeding member 20 is separated from the water retention member 22 of the cell plug 12 (details will be described later), the liquid F is suppressed from dropping from the other end 20b toward the cell plug 12, and the liquid F is suppressed from being excessively supplied to the culture medium S in the cell plug 12.

The cell plug lifting unit 16 of the irrigation device 10 is configured to lower the cell plug 12 as illustrated in FIG. 3B when the weight of the cell plug 12 is increased by the liquid F supplied by the liquid supply unit 14. The cell plug lifting unit 16 is configured to lift the cell plug 12 as illustrated in FIG. 3A when the weight of the cell plug 12 is decreased by drying of the culture medium.

In the case of the present first embodiment, as illustrated in FIGS. 1 and 2, the cell plug lifting unit 16 includes a working fluid accommodation part 26 and a working fluid WF accommodated in the working fluid accommodation part 26. In the case of the present first embodiment, as illustrated in FIGS. 3A and 3B, the cell plug lifting unit 16 lifts and lowers the cell plug 12 by buoyancy acting on a part of the cell plug 12 immersed in the working fluid WF.

As illustrated in FIGS. 3A and 3B, the working fluid accommodation part 26 of the cell plug lifting unit 16 is a tank that accommodates the working fluid WF in which a part of each of the plurality of cell plugs 12 is immersed to give buoyancy to the cell plug 12. In the case of the present first embodiment, the working fluid accommodation part 26 is shared by the plurality of cell plugs 12. The working fluid accommodation part 26 may be a gutter through which the working fluid WF flows.

The working fluid WF of the cell plug lifting unit 16 is, for example, water, and is a member that lifts and lowers the cell plug 12 by buoyancy. For example, as illustrated in FIG. 3B, the working fluid WF is a fluid that has a density at which the entire cell plug 12 does not sink when the culture medium S in the cell plug 12 retains the liquid F over the entire cell plug 12 and the seedlings in the cell plug 12 have the maximum size. The "maximum size" of the seedling is the maximum size of the seedling to be handled by the irrigation device 10, and refers to a size in which the seedling needs to be transferred from the irrigation device 10 to another place (e.g., soil).

The temperature of the culture medium S in the cell plug 12 may be adjusted by adjusting the temperature of the working fluid WF. For example, the culture medium S in the cell plug 12 can be maintained constant by a sensor (not illustrated) that detects the temperature of the working fluid WF and a heater (not illustrated) that heats the working fluid WF in order to maintain the temperature detected by the sensor at a predetermined temperature.

In the case of the present first embodiment, as illustrated in FIG. 2, the cell plug lifting unit 16 includes a guide member 28 that guides each of the plurality of cell plugs 12 to preferably move in the vertical direction (Z-axis direction) with buoyancy by the working fluid WF.

As illustrated in FIGS. 1 and 2, the guide member 28 has a plate shape and is disposed in a state of being immersed in the working fluid WF in the working fluid accommodation part 26. As illustrated in FIG. 2, the guide member 28 includes a plurality of guide holes 28a in a through-hole shape through which the main body part 12d of the cell plug 12 can pass. An inner peripheral surface 28b of the guide hole 28a guides the outer peripheral surface of the cylindrical part 12e in the main body part 12d of the cell plug 12. With such the guide member 28, the cell plug 12 in a state of floating in the working fluid WF is more reliably maintained in a posture in which the opening 12a faces upward. Note that the guide member 28 may be configured to be attachable to and detachable from the irrigation device 10. Due to this, the guide member 28 can be used as a tray for collectively feeding the plurality of cell plugs 12.

The configuration of the irrigation device 10 of the present first embodiment has been described above. Hereinafter, the operation of the irrigation device 10 will be described with reference to FIGS. 3A and 3B.

First, the cell plug 12 in a state where the entire culture medium S is dry as illustrated in FIG. 3A is lighter than that in a case where the entire culture medium S is wet (the liquid F is retained over the entire culture medium S) as illustrated in FIG. 3B. Therefore, due to the buoyancy of the working fluid WF, the cell plug 12 in a state where the entire culture medium S is dry is disposed at a higher level than the cell plug 12 in a state where the entire culture medium S is wet.

As illustrated in FIG. 3A, when the cell plug 12 in a state where the entire culture medium S is dry by the buoyancy of the working fluid WF is positioned at a relatively high level, the other end (contact end) 20b of the liquid feeding member 20 of the liquid supply unit 14 is in contact with the water retention member 22 on the culture medium S. Due to this, the liquid F in the liquid accommodation part 18 of the liquid supply unit 14 is supplied to the culture medium S in the dry state in the cell plug 12 via the liquid feeding member 20 and the water retention member 22. As a result, the culture medium S starts to be wet.

As the range in which the liquid F spreads in the culture medium S expands, the weight of the cell plug 12 increases accordingly. Due to this, the cell plug 12 sinks (lowers) in the working fluid WF. When the liquid F finally spreads over substantially the entire culture medium S, as illustrated in FIG. 3B, the cell plug 12 reaches a relatively low level, and the other end (contact end) 20b of the liquid feeding member 20 is separated from the water retention member 22. Due to this, the liquid supply to the culture medium S by the liquid supply unit 14 is interrupted.

After the liquid supply is interrupted, the liquid F retained by the culture medium S decreases as it is consumed by the seedling W and evaporates, and the weight of the cell plug 12 decreases. Due to this, the cell plug 12 floats (rises) in the working fluid WF. Finally, when the culture medium S is dried substantially entirely, as illustrated in FIG. 3A, the cell plug 12 reaches a relatively high level, and the other end (contact end) 20b of the liquid feeding member 20 is brought into contact with the water retention member 22 again. Due to this, the liquid supply to the culture medium S by the liquid supply unit 14 is resumed.

As described above, the supply of the liquid F to the culture medium S in the cell plug 12 by the liquid supply unit 14 is intermittently performed according to the state of the culture medium S, specifically, according to the amount of water retained in the culture medium S. As a result, an appropriate amount of the liquid F can be supplied to the culture medium S without excess or deficiency.

Such intermittent supply of the liquid F suppresses the occurrence of problems that may occur when the culture medium S retains the liquid F excessively, for example, problems such as propagation of various bacteria and the like in the culture medium S and decay of roots of seedlings W. The occurrence of a problem that may occur when the culture medium S is excessively dried, for example, the occurrence of a problem that the seedling W dies is suppressed.

According to the present first embodiment, the irrigation device 10 can supply an appropriate amount of the liquid F, according to the state of the culture medium S without excess or deficiency, to the culture medium S of the cell plug 12 in which the seedlings W are planted, with a simple configuration without using a power-consuming device such as a sensor or a valve.

By adjusting the amount of the working fluid WF accommodated in the working fluid accommodation part 26 of the cell plug lifting unit 16, that is, by adjusting the liquid level of the working fluid WF, it is possible to adjust, at a time, the supply amount of the liquid F to the culture medium S in the plurality of cell plugs 12. Specifically, by adjusting the liquid level of the working fluid WF, it is possible to adjust the contact time between the other end (contact end) 20b of the liquid feeding member 20 of the liquid supply unit 14 and the culture medium S (the water retention member 22 thereon) in the cell plug 12, and as a result, it is possible to adjust the supply time of the liquid F to the culture medium S.

Furthermore, the liquid F can be intermittently supplied to the culture medium S in the cell plug 12 by the liquid feeding member 20 of the liquid supply unit 14 without using a pump, a valve, or the like.

Second Embodiment

The present second embodiment is an improvement of the first embodiment described above. Therefore, the irrigation device according to the present second embodiment will be described focusing on the difference from the first embodiment described above. Note that components substantially the same as the constituent elements of the first embodiment described above are denoted by the same reference numerals.

Figure 4:
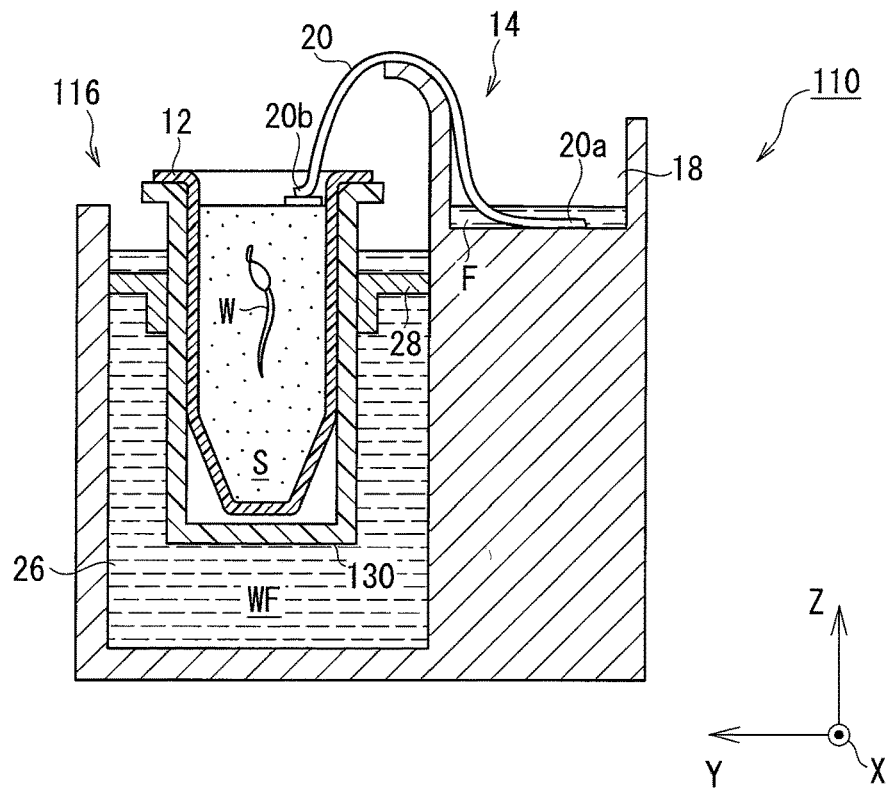
FIG. 4 is a cross-sectional view of an irrigation device according to a second embodiment of the present invention.

FIG. 4 is a cross-sectional view of the irrigation device according to the second embodiment of the present invention.

In an irrigation device 110 according to the present second embodiment illustrated in FIG. 4, the cell plug 12 is lifted and lowered by the working fluid WF without coming into contact with the working fluid WF. Therefore, a cell plug lifting unit 116 includes a cup-shaped holder 130 that detachably accommodates and holds the cell plug 12. When a part of the holder 130 is immersed in the working fluid WF and receives buoyancy, the holder 130 lifts and lowers. Due to this, the cell plug 12 is lifted and lowered by the working fluid WF without coming into contact with the working fluid WF. As a result, for example, when the cell plug 12 is fed from the irrigation device 110 to another device, it is not necessary to wipe the cell plug.

Also in the present second embodiment, similarly to the first embodiment described above, the irrigation device 110 can supply an appropriate amount of the liquid F, according to the state of the culture medium S without excess or deficiency, to the culture medium S of the cell plug 12 in which the seedlings W are planted, with a simple configuration without using a sensor, a valve, or the like.

Third Embodiment

The present third embodiment is different from the first embodiment described above in the configuration of a cell plug lifting unit that lifts and lowers a cell plug. Therefore, the irrigation device according to the present third embodiment will be described focusing on the cell plug lifting unit different from the first embodiment described above. Note that components substantially the same as the constituent elements of the first embodiment described above are denoted by the same reference numerals.

Figure 5:
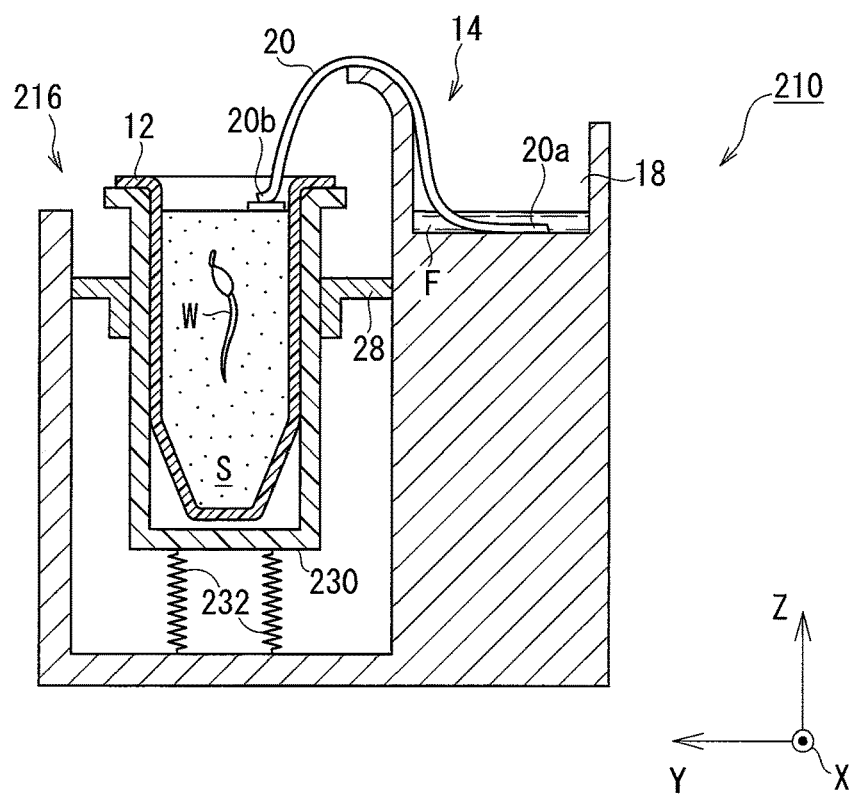
FIG. 5 is a cross-sectional view of an irrigation device according to a third embodiment of the present invention.

FIG. 5 is a cross-sectional view of the irrigation device according to the third embodiment of the present invention.

In an irrigation device 210 according to the present third embodiment, a cell plug lifting unit 216 includes a holder 230 that detachably holds the cell plug 12 and an elastic member 232 that supports the holder 230 in a liftable manner. The elastic member 232 is, for example, a coil spring, an air spring, a cushion, rubber, sponge, or the like. That is, the elastic member 232 is a member that is elastically deformed by a change in weight of the cell plug 12. In the case of the present third embodiment, the elastic member 232 supports the holder 230 from below, and expands and contracts in the vertical direction (Z-axis direction) by the weight change of the cell plug 12 in the holder 230.

According to such the cell plug lifting unit 216, unlike the cell plug lifting unit 16 of the first embodiment described above, the cell plug 12 can be lifted and lowered without using the working fluid WF.

Also in the present third embodiment, similarly to the first embodiment described above, the irrigation device 210 can supply an appropriate amount of the liquid F, according to the state of the culture medium S without excess or deficiency, to the culture medium S of the cell plug 12 in which the seedlings W are planted, with a simple configuration without using a sensor, a valve, or the like.

While the present invention has been described with reference to the above-described first to third embodiments, embodiments of the present invention are not limited thereto.

For example, in the case of the first embodiment described above, as illustrated in FIG. 2, when viewed in the opening direction (Z-axis direction) of the opening 12a, the main body part 12d of the cell plug 12 has a quadrangular cross section. However, embodiments of the present invention are not limited thereto. For example, the main body part of the cell plug may have a circular cross section.

In the case of the first to third embodiments described above, the liquid supply unit 14 supplies the liquid F to the culture medium S in the cell plug 12 using the liquid feeding member 20 in which a capillary phenomenon occurs such as a nonwoven fabric. However, embodiments of the present invention are not limited thereto. For example, the liquid supply unit may use a mechanical valve including a valve body (contact end) in contact with the culture medium. This mechanical valve is configured such that the valve is opened when the culture medium retracts the valve body due to lifting of the cell plug, and the valve body returns to the original state by a spring or the like and the valve is closed when the cell plug is lowered.

As described above, the above-described embodiments have been described as examples of the technology in the present invention. For this purpose, the accompanying drawings and the detailed description have been provided.

Therefore, the components described in the accompanying drawings and the detailed description can include not only components essential for solving the problem but also components that are not essential for solving the problem in order to illustrate the technology. Therefore, it should not be immediately recognized that these non-essential components are essential based on the fact that these non-essential components are described in the accompanying drawings and the detailed description.

In addition, since the above-described embodiments are intended to illustrate the technology in the present invention, various changes, replacements, additions, omissions, and the like can be made within the scope of the claims or equivalents thereof.

INDUSTRIAL APPLICABILITY

The present invention can be applied to any irrigation device that gives liquid to seedlings regardless of the type of seedlings and the type of liquid given to seedlings.

The invention claimed is:

1. An irrigation device comprising:
   a cell plug that includes an opening facing upward and an accommodation part that accommodates a predetermined amount of culture medium in communication with the opening;
   a liquid supply unit that supplies a liquid to the culture medium of the cell plug; and
   a cell plug lifting unit that lowers the cell plug when a weight of the cell plug is increased by a liquid supplied by the liquid supply unit and lifts the cell plug when a weight of the cell plug is decreased by drying of the culture medium, wherein
   the liquid supply unit includes a contact end that is intermittently brought into contact with the culture medium by lifting and lowering of the cell plug by the cell plug lifting unit, performs liquid supply while the contact end is in contact with the culture medium, and stops liquid supply when the contact end is separated from the culture medium.

2. The irrigation device according to claim 1, wherein the cell plug lifting unit includes a working fluid accommodation part and a working fluid that is accommodated in the working fluid accommodation part, the working fluid into which a part of the cell plug is immersed to give buoyancy to the cell plug.

3. The irrigation device according to claim 2, wherein the cell plug lifting unit includes a guide member that guides the cell plug such that the cell plug moves in a vertical direction.

4. The irrigation device according to claim 1, wherein the cell plug lifting unit includes a holder that holds the cell plug and an elastic member that supports the holder in a liftable manner.

5. The irrigation device according to claim 1, wherein the cell plug is attachable to and detachable from the cell plug lifting unit.

6. The irrigation device according to claim 1, wherein the liquid supply unit includes a liquid accommodation part, and a liquid feeding member that includes one end immersed in a liquid in the liquid accommodation part and another end that is the contact end, and feeds a liquid from the one end to the other end by capillary action.

7. The irrigation device according to claim 6, wherein the liquid supply unit includes a support unit that supports the liquid feeding member such that another end of the liquid feeding member is positioned at a same or high level with respect to one end.

8. The irrigation device according to claim 6, wherein the liquid feeding member is a nonwoven fabric.

9. The irrigation device according to claim 6, wherein a water retention member in contact with another end of the liquid feeding member is provided on the culture medium in the cell plug.

10. A cell plug made of a material that floats in liquid, the cell plug comprising:
   an opening, and a main body part that defines an accommodation part that accommodates a predetermined amount of culture medium in communication with the opening, wherein
   the main body part includes a cylindrical part extending from an edge of the opening in an opening direction of the opening, and a bottom part having an inverted conical shape or an inverted frustum shape and connected to the cylindrical part, wherein the cell plug is configured to float in the liquid.

11. The cell plug according to claim 10, wherein the main body does not have a through hole.

* * * * *